United States Statutory Invention Registration [19]

[11] Reg. Number: H369

Cottingham [43] Published: Nov. 3, 1987

[54] MECHANICALLY STABLE, HIGH ASPECT RATIO, MULTIFILAR, WOUND, RIBBON-TYPE CONDUCTOR AND METHOD FOR MANUFACTURING SAME

[75] Inventor: James G. Cottingham, Center Moriches, N.Y.

[73] Assignee: The United States of America as represented by the Department of Energy, Washington, D.C.

[21] Appl. No.: 358,086

[22] Filed: Mar. 15, 1982

[51] Int. Cl.[4] ..... H01B 12/00

[52] U.S. Cl. ..... 174/128 S; 29/599; 174/113 C; 174/126 S; 174/129 R

[58] Field of Search ..... 29/599; 174/113 A, 113 C, 174/126 S, 128 S, 129 R; 335/216

[56] References Cited

U.S. PATENT DOCUMENTS

| | | | |
|---|---|---|---|
| 1,655,106 | 1/1928 | Parsons et al. | 174/129 R |
| 3,595,982 | 7/1971 | Kafka | 174/15 S |
| 3,638,154 | 1/1972 | Sampson et al. | 174/126 S X |
| 3,639,672 | 2/1972 | Kafka | 174/129 R |
| 3,715,452 | 2/1973 | Long | 174/15 C |
| 3,743,986 | 7/1973 | McInturff et al. | 174/126 S |
| 4,271,585 | 6/1981 | Satti | 29/599 |
| 4,367,372 | 1/1983 | Kiblaire et al. | 174/126 S |

OTHER PUBLICATIONS

Accelerator Superconducting Magnets Give Headaches; Physics Today; Apr. 1, 1981, pp. 17–20.

Onishi, T.; Fabrication Of Cryostable, Low-Loss Cable For a 3.8 MJ Pulsed Superconducting Coil; Conference, 9th Symposium on Engineering Problems & Fusion Research; Chicago, Illinois; Oct. 26–29, 1981.

*Primary Examiner*—Stephen C. Buczinski
*Assistant Examiner*—Linda J. Wallace
*Attorney, Agent, or Firm*—Jeannette M. Walder; Paul A. Gottlieb; Judson R. Hightower

[57] ABSTRACT

A mechanically stable, wound, multifilar, ribbon-type conductor having a cross-sectional aspect ratio which may be greater than 12:1, comprising a plurality of conductive strands wound to form a flattened helix containing a plastic strip into which the strands have been pressed so as to form a bond between the strip and the strands. The bond mechanically stabilizes the conductor under tension, preventing it from collapsing into a tubular configuration. In preferred embodiments the plastic strip may be polytetrafluoroethylene, and the conductive strands may be formed from a superconductive material. Conductors in accordance with the present invention may be manufactured by winding a plurality of conductive strands around a hollow mandrel; the cross-section of a hollow mandrel; the cross-section of the mandrel continuously varying from substantially circular to a high aspect ratio elipse while maintaining a constant circumference. The wound conductive strands are drawn from the mandrel as a multifilar helix while simultaneously a plastic strip is fed through the hollow mandrel so that it is contained within the helix as it is withdrawn from the mandrel. The helical conductor is then compressed into a ribbon-like form and the strands are bonded to the plastic strip by a combination of heat and pressure.

12 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MECHANICALLY STABLE, HIGH ASPECT RATIO, MULTIFILAR, WOUND, RIBBON-TYPE CONDUCTOR AND METHOD FOR MANUFACTURING SAME

The U.S. Government has rights in this invention pursuant to Contract No. DE-AC02-76CH00016, between the U.S. Department of Energy and Associated Universities, Inc.

BACKGROUND OF THE INVENTION

This invention relates to ribbon-type conductors, and more particularly to a ribbon-type superconductor having low eddy current losses, and to a method for manufacturing such superconductor.

In superconducting magnets of the type used in high energy particle accelerators the use of high aspect ratio, solder filled, braided superconductor has been proposed. (See *Physics Today,* Apr. 1981, pg. 17). Superconducting wires are braided to form a ribbon-type conductor, substantially as described in U.S. Pat. No. 3,638,154 to Sampson, et al., date Jan. 25, 1972. The interstices of the braid are then filled with a solder, typically a nominal 97 weight % Sn, 3 weight % Ag solder, in order to provide stiffness and mechanical stability to the ribbon.

While the solder provided mechanical stability, it also provided a path for eddy currents which sometimes caused unexpectable losses in magnets made with such braided superconductor. This problem was particularly difficult to deal with, since eddy current losses varied from magnet to magnet.

Examination of samples of superconductors used in prototype magnets lead to the hypothesis that low eddy current losses were related to the formation of cracks in the solder. Based on this hypothesis, efforts were made to develop methods for producing controlled cracking of the solder. As a result of these efforts, two separate methods were developed. One method, conceived by T. Luhman and M. Suenaga, is the subject of a commonly assigned application Ser. No. 358,083, filed Mar. 15, 1982, now U.S. Pat. No. 4,431,862, and has as its object the production of a ribbon-type superconductor having a greatly increased interwire resistance so as to greatly reduce eddy current losses in the superconductor. This method, however, results in a superconductor which has a substantially reduced mechanical stability. Further, this method is only suitable for use with tin based solders.

A second method conceived by T. Luhman and C. Klamut is also the subject of a commonly assigned application Ser. No. 358,085, filed Mar. 15, 1982, now U.S. Pat. No. 4,426,550. This method produced a superconductor having substantial mechanical stability, but which had only limited improvement in eddy current losses.

Further problems with braided ribbon-type superconductors are a relatively poor "packing factor" (i.e., the amount of conductive material in a given volume of conductor), which limits the current carrying capability, and excessive deformation of individual strands when the braided superconductor is pressed into a ribbon.

Since no fully satisfactory solution to the problems of braided conductors had been found, it was decided to re-evaluate the original decision to use braid. This decision had been based on the known mechanical instability under tension of wound cables of high aspect ratio (i.e., ribbon-type cables having a high width to thickness ratio). Such cables tended to collapse to a tubular configuration under tension if they had an aspect ratio above about 12:1, and so could not conveniently be wound into magnet coils. Thus, solder filled ribbon-type conductors were proposed to provide a mechanically stable ribbon-type conductor. However, it was known from experience with wound conductors having a lower aspect ratio, so that mechanical stability under tension was not a problem, that such conductors had a higher packing factor, and thus high current carrying capability per unit volume. (Wound multifilar conductors are commonly known, and will hereinafter be referred to as Rutherford pattern conductors). Thus, it became an object of the subject invention to provide a high aspect ratio Rutherford pattern conductor which is mechanically stable under tension.

It is a further object of the subject invention to provide such a cable that also has satisfactory eddy current losses.

BRIEF SUMMARY OF THE INVENTION

The disadvantages of the prior art are overcome by means of a ribbon-type, Rutherford pattern conductor, comprising a plurality of conductive strands wound to form a flattened multifilar helix. A plastic strip is contained within said helix and the strands are pressed into the strip and heated so as to form a bond whereby the mechanical stability under tension of the conductor is increased. In preferred embodiments the plastic strip may be formed from polytetrafluoroethylene and/or the strands may comprise a superconductive material.

A conductor in accordance with the subject invention may be manufactured by a process comprising the steps of continuously winding a plurality of conductive strands around a hollow mandrel while simultaneously drawing the conductor so formed from the mandrel, so that the conductor so formed has the form of a multifilar helix. The mandrel has a cross-section which continuously varies from circular to highly eliptical while maintaining a constant circumference and the conductor is drawn from the eliptical end so that the conductor has the form of a multifilar helix with a high aspect ratio eliptical cross-section. (By high aspect ratio herein is meant an aspect ratio such that a Rutherford pattern conductor having this or greater aspect ratio is mechanically unstable under tension; typically an aspect ratio of 12:1 or larger.)

A plastic strip is fed through the hollow mandrel as the conductor is drawn off so that the strip is contained within the helix. Compressive forces are applied to the eliptical helix so that the conductor assumes a ribbon-like form and the strands are pressed into the strips. The conductor is then heated so that the strands are bonded to the strip and then cooled.

Conductors in accordance with the subject invention have been found to advantageously provide a high aspect ratio Rutherford pattern conductor which is mechanically stable under tension and which has an interstrand resistance sufficiently high to reduce eddy current losses to an acceptable level.

It is a further advantage of the subject invention that, as compared to braided type conductors, it possesses approximately 10 to 25 percent more conductive area per unit cross-sectional area.

Other objects and advantages of the subject invention will be apparent to those skilled in the art from a consideration of the detailed description and examples set forth below and in the attached drawings.

DETAILED DESCRIPTION OF THE INVENTION

Figure 1:
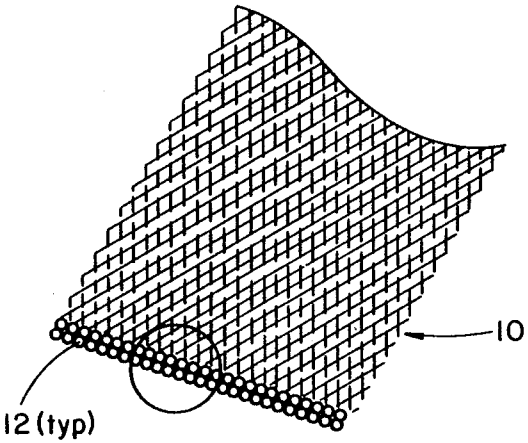
FIG. 1 is an isometric view of a section of conductor in accordance with the subject invention.
Figure 2:
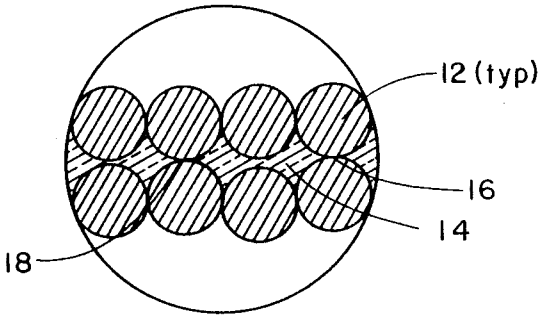
FIG. 2 is an expanded detail of a cross-section of FIG. 1

Referring to FIGS. 1 and 2, there is shown a conductor 10 in accordance with the subject invention. A plurality of conductive strands 12 are wound to form a flattened multifilar helix having an aspect ratio of about 22:1. Such a conductor may be characterized by any three of four parameters, the width of conductor 10, the diameter of strands 12 (assumed to have a circular cross-section), the pitch (i.e. the length along conductor 10 in which a pattern repeats), and the number of strands. By proper choice of these parameters in accordance with principles well known in the art of conductor manufacture, a flat uniform conductor may be formed (i.e. one where no strands are displaced from the pattern). An embodiment suitable for use in a superconducting magnet of the type described in the report *A Proton-Proton Colliding Beam Facility,* BNL 50648, pgs. 62–68, (available from the National Technical Information Service, Springfield, Va.) comprises an 86 strand conductor having a 6 inch pitch, a wire diameter of approximately 0.015 inches, and a width of approximately 0.64 inches.

In this embodiment the conductive strands 12 comprise niobium-titanium superconductive material and embedded in and bonded to a polytetrafluoroethylene strip. (Niobium-titanium superconducting wires are well known for the manufacture of superconducting magnet coils and a further description of such wires is not believed necessary for an understanding of the present invention.) FIG. 2 shows a detail cross-section of the wire of FIG. 1. Conductive strands 12 are bonded to plastic strip 14 by a combination of heat and pressure, as will be more fully described below. Examination of FIG. 2 shows the improved ratio of conductive areas per unit cross-sectional area, as opposed to a solder filled braided conductor. Use of a plastic material to bond the strands allows it to be held in a more compact configuration. The strands may be pressed so tightly that there is actual contact between strands at many of the cross-over points, as is shown at 16 and 18 in FIG. 2, without unduly decreasing the interstrand resistance. However, if a higher interstrand resistance is desired somewhat less pressure may be used to avoid the metal contact at the cross-overs. (Note the strand cross-sections are shown as circular for ease of illustration, but are actually elipitical due to the pitch of the strands and may be slightly deformed in the manufacturing process as will be described more fully below.)

Figure 3:
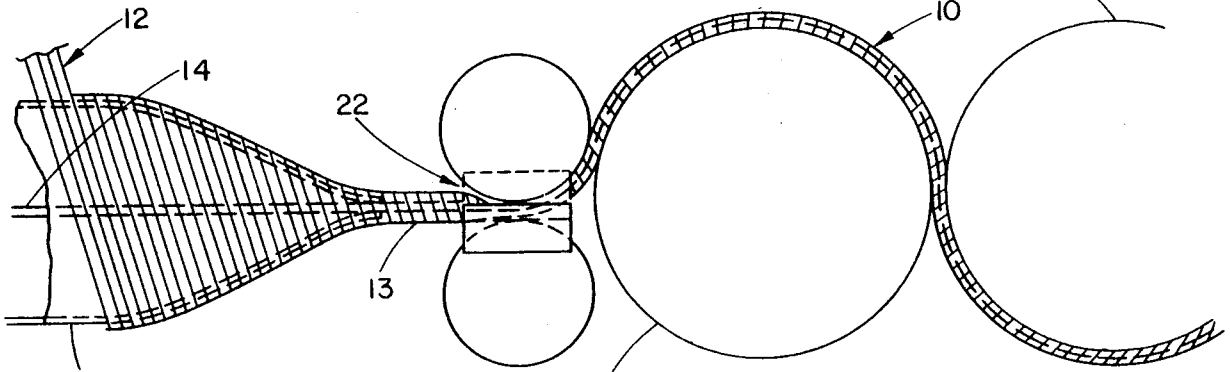
FIG. 3 is a semi-schematic representation of an apparatus used to manufacture a conductor in accordance with the subject invention.

Turning to FIG. 3, there is shown a semi-schematic cross-section of an apparatus for the manufacture of a conductor in accordance with the subject invention. Conductive strands 12 are wrapped onto mandrel 20 by a conventional wire wrapping apparatus (not shown). (Note that only three strands are shown for ease of illustration. The actual number of strands, will, however, be determined by the desired application in accordance with well known principles.) The cross-section of mandrel 20 varies continuously from substantially circular to a highly eliptical cross-section having the desired aspect ratio which can be higher than 12:1, while the cross-section circumference remains constant. Thus, strands 12 are wound into a multifilar eliptical helix 13. Helix 13 is drawn from mandrel 20 simultaneously with plastic strip 14, which passes through the hollow center of mandrel 20, so that strip 14 is contained within helix 13. Helix 13 and strip 14 then pass through Turk's head roller assembly 22 where they are compressed both laterally and transversely to form ribbon-like conductor 10. Conductor 10 then passes over an intermediate roller 24 and a heated roller 26. Heated roller 26 briefly raises the temperature of conductor 10 above the melting point of plastic strip 14 to bond strands 12 to plastic strip 14. (Where strands 12 are superconducting strands care must be taken in this heating step to avoid degrading the superconductive properties.) Conductor 10 is then cooled by cooling roller (not shown) to complete the process.

EXPERIMENTAL EXAMPLE

A short length test sample of the subject invention was produced by wrapping a thin rectangular cross-section mandrel with a sheet of polytetrafluoroethylene approximately 0.002 inches thick. The mandrel was then wrapped with 86 strands of 0.015 inch superconductor. The mandrel was then partially withdrawn and the strands bonded to the polytetrafluoroethylene with a heated press. This step was repeated until a sample approximately 3 feet by 0.64 inches by 0.025 inches thick having a pitch of about 6 inches was produced.

This sample was tested and found to have good mechanical stability under tension. The elastic modulus was measured as $3.8\times10^6$ psi as compared to an elastic modulus of $2.4\times10^6$ psi for solder filled braid. The interstrand resistance was measured and found to be approximately $40\times10^{-5}$ ohms/transposition, compared to an interstrand resistance of from $0.3\times10^{-5}$ ohms/-transposition for a solder filled braid having acceptable mechanical properties and $3000\times10^{-5}$ ohms/transposition for a high resistance solder filled braid, which, however, lacks acceptable mechanical properties.

It was calculated that the sample contained approximately 25% more conductor than a braided solder filled conductor of similar dimensions.

The above detailed description and experimental examples and the attached drawings are intended only to illustrate the subject invention, and other embodiments will be apparent to those skilled in the art. Thus, limitations on the scope of the subject invention are to be found only in the claims set forth below.

I claim:

1. A ribbon-type superconductor having low eddy current losses and improved mechanical stability under tension comprising a plurality of superconductive strands wound to form a flattened multifilar helix, said helix containing a plastic strip into which said strands have been pressed so as to form a bond between said strip and said strands.

2. The superconductor of claim 1 wherein said strip is formed of polytetrafluoroethylene.

3. The superconductor of claim 1 wherein said strands have been compressed laterally and transversely into said strip.

4. The superconductor of claim 1 wherein said strands are bonded to said strip by a combination of heat and pressure.

5. The superconductor of claim 2 wherein said strands are formed of niobium-titanium.

6. The superconductor of claim 1 having an aspect ratio of at least 12:1.

7. A ribbon-type superconductor comprising a plurality of superconductive strands wound to form a uniform, flattened, multifilar, high aspect ratio helix, said helix containing a plastic strip bonded to said strands.

8. The superconductor of claim 7 having an aspect ratio of at least 12:1.

9. The ribbon-type superconductor of claim 1 produced by the steps of:

(a) providing a hollow mandrel, said mandrel having a cross-section which continuously varies from substantially circular to a high aspect ratio elipse while maintaining a constant circumference;

(b) continuously winding a plurality of superconductive strands around said mandrel while simultaneously drawing the conductor so formed from the eliptical end of said mandrel, so that said conductor has the form of multifilar helix with a high aspect ratio eliptical cross-section;

(c) simultaneously feeding a plastic strip through said mandrel so that said strip is contained within said helix as said conductor is withdrawn from said mandrel;

(d) applying compressive forces to said helical conductor so that said conductor assumes a ribbon-like form and said strands are pressed into said strip;

(e) heating said conductor so that said strands are bonded to said strip; and (f) cooling said conductor.

10. A method for producing a ribbon-type conductor of the Rutherford type, comprising the steps of:

(a) providing a hollow mandrel, said mandrel having a cross-section which continuously varies from substantially circular to a high aspect ratio elipse while maintaining a constant circumference;

(b) continuously winding a plurality of conductive strands around said mandrel while simultaneously drawing the conductor so formed from the eliptical end of said mandrel, so that said conductor has the form of multifilar helix with a high aspect ratio eliptical cross-section;

(c) simultaneously feeding a plastic strip through said mandrel so that said strip is contained within said helix as said conductor is withdrawn from said mandrel;

(d) applying compressive forces to said helical conductor so that said conductor assumes a ribbon-like form and said strands are pressed into said strip;

(e) heating said conductor so that said strands are bonded to said strip; and;

(f) cooling said conductor.

11. A method as described in claim 10, wherein said strip is formed of polytetrafluoroethylene.

12. A method as described in claim 10 or 11, wherein said strands comprise superconductive material.

* * * * *